(12) United States Patent
Yang

(10) Patent No.: US 7,827,939 B2
(45) Date of Patent: Nov. 9, 2010

(54) BIRD CAGE

(76) Inventor: Leon Yang, 231 Norman Ave., Suite 508, Brooklyn, NY (US) 11222

( * ) Notice: Subject to any disclaimer, the term of this patent is extended or adjusted under 35 U.S.C. 154(b) by 258 days.

(21) Appl. No.: 12/222,763

(22) Filed: Aug. 15, 2008

(65) Prior Publication Data

US 2010/0037830 A1 Feb. 18, 2010

(51) Int. Cl.
*A01K 31/08* (2006.01)

(52) U.S. Cl. .................. 119/461; 119/474; 403/307

(58) Field of Classification Search .............. 119/452, 119/453, 459, 461–463, 472, 474, 498–499; 403/307, 293, 296

See application file for complete search history.

(56) References Cited

U.S. PATENT DOCUMENTS

| | | | |
|---|---|---|---|
| 1,685,922 A | 10/1928 | Leon | |
| 3,645,569 A * | 2/1972 | Reilly | 403/4 |
| 3,774,576 A * | 11/1973 | Moore | 119/480 |
| 4,770,560 A * | 9/1988 | Ott | 403/296 |
| 5,000,121 A | 3/1991 | Daily | 119/17 |
| 5,452,681 A | 9/1995 | Ho | 119/17 |
| 5,996,536 A | 12/1999 | King | 119/459 |
| 6,129,052 A | 10/2000 | Huang | 119/461 |
| 6,763,784 B1 | 7/2004 | Liu | 119/452 |
| 6,832,580 B2 * | 12/2004 | Marchioro | 119/452 |
| 6,990,926 B2 | 1/2006 | Gao | 119/461 |
| 7,093,564 B1 | 8/2006 | Plante et al. | 119/461 |
| 2006/0225663 A1 | 10/2006 | Chiang | 119/452 |
| 2007/0044726 A1 | 3/2007 | Willinger et al. | 119/461 |

* cited by examiner

*Primary Examiner*—Rob Swiatek
*Assistant Examiner*—Ebony Evans
(74) *Attorney, Agent, or Firm*—Jacobson Holman PLLC

(57) ABSTRACT

A modular bird cage includes a plurality of support posts located at the corners of the cage. The support posts are made up of an internal column and an external post surrounding the internal column. The internal column is internally threaded to rigidly connect a base portion and an upper portion of the bird cage. The internally threaded column engages a vertically extending threaded stud extending from the base portion. Two perpendicular, radially extending lugs are mounted on the base portion spaced from the stud. The internally threaded column, when fully engaged with the externally threaded stud, abuts against the two radially projecting lugs, filling the space between the stud and the lugs. A hollow external post is passed over the column and includes two perpendicularly located arched openings which engage the two lugs mounted on the base portion.

17 Claims, 5 Drawing Sheets

BIRD CAGE

FIELD OF THE INVENTION

The present invention relates to a modular bird cage capable of being easily transported, assembled and cleaned.

BACKGROUND OF THE INVENTION

Known bird cages often include an interconnection of various parts by welding or have permanently connected pieces using bolts and nuts. These assembled cages require a large base to transport and are difficult to clean. The assembly of these cages require use of tools and mechanical knowledge by the bird owner.

SUMMARY OF THE INVENTION

Accordingly, it is an object of the present invention to provide an easily assembled and disassembled bird cage that is intuitively assembled by a bird owner and provides ease of access to the interior of the cage for cleaning and changing of the interior of the bird cage.

According to the present invention a modular bird cage includes a support assembly having a plurality of support posts located at the corners of the cage. The support posts are made up of an internal column and an external post surrounding the internal column. The internal column is internally threaded to rigidly connect a base portion and an upper portion of the bird cage. The internally threaded column engages a vertically extending, threaded stud extending from the base portion.

Two perpendicular, radially extending cylindrical lugs are mounted on the base portion spaced from the stud. The lugs define a space or a gap between the stud and the lugs. The internally threaded column, when fully engaged with the externally threaded stud, abuts against the two radially projecting lugs and fills the gap between the stud and the lugs to securely wedge the column between the stud and lugs.

A hollow external post is passed over the column. The post includes two perpendicularly located openings terminating in a semi-circular portion which engage the two lugs mounted on the base portion. The lugs are inter-engaged in the openings with the semi-circular portions engaging an upper surface of the lugs. This inter-engagement secures a positioning of the external post.

The external post also includes two perpendicular, radially extending U-shaped channels which are aligned along the side walls of the base portion. The U-shaped channels provide a guide path for the side panels of the bird cage which fit within the U-shaped channels on the external posts and also engage vertically extending U-shaped channels mounted on the base portion.

Similarly, downwardly extending U-shaped channels of the upper portion engage the upper edges of the side panels of the bird cage. The upper portion includes a connector for engaging an upper end of the internal column. The connector rests on a top edge of the post. The post has a shorter length than the column.

A threaded finial passes through the connector of the upper portion and engages the internal threads of the upper end of the internal column. The bird cage of the present invention is thereby easily assembled and disassembled by only manual manipulation.

By the present invention, it is possible to powder coat the metallic portions of the bird cage in different colors. The side panels and other portions of the bird cage can be made of different colors for a mix and matching of color arrangements.

Accordingly, it is another object of the present invention to provide a modular bird cage having manually connectable parts for ease of assembly and disassembly for storage, transportation and cleaning.

It is another object of the present invention to provide a modular bird cage having an upper portion and a base portion connected by an external post having U-shaped channels for guiding a side panel of the bird cage with the external post slidably mounted on an internal column and with the column threadably engaging an externally threaded, vertically extending stud mounted on the base portion.

It is still yet another object of the present invention to provide a modular bird cage having an upper portion and a base portion connected by an external post having U-shaped channels for guiding a side panel of the bird cage with the external post slidably mounted on an internal column and with the column threadably engaging an externally threaded, vertically extending stud mounted on the base portion, and with the base portion including two perpendicular extending lugs engaging arched openings at the base of the external post.

It is still yet another object of the present invention to provide a modular bird cage having an upper portion and a base portion connected by an external post having U-shaped channels for guiding a side panel of the bird cage with the external post slidably mounted on an internal column and with the column threadably engaging an externally threaded, vertically extending stud mounted on the base portion, with the base portion, upper portion and posts also including U-shaped channels to slidably locate the side panels on all four sides of the bird cage.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the bird cage disclosed herein, and are for illustrative purposes only. Other embodiments that are substantially similar can use other components that have a different appearance.

DETAILED DESCRIPTION OF THE PREFERRED EMBODIMENTS

Figure 1:
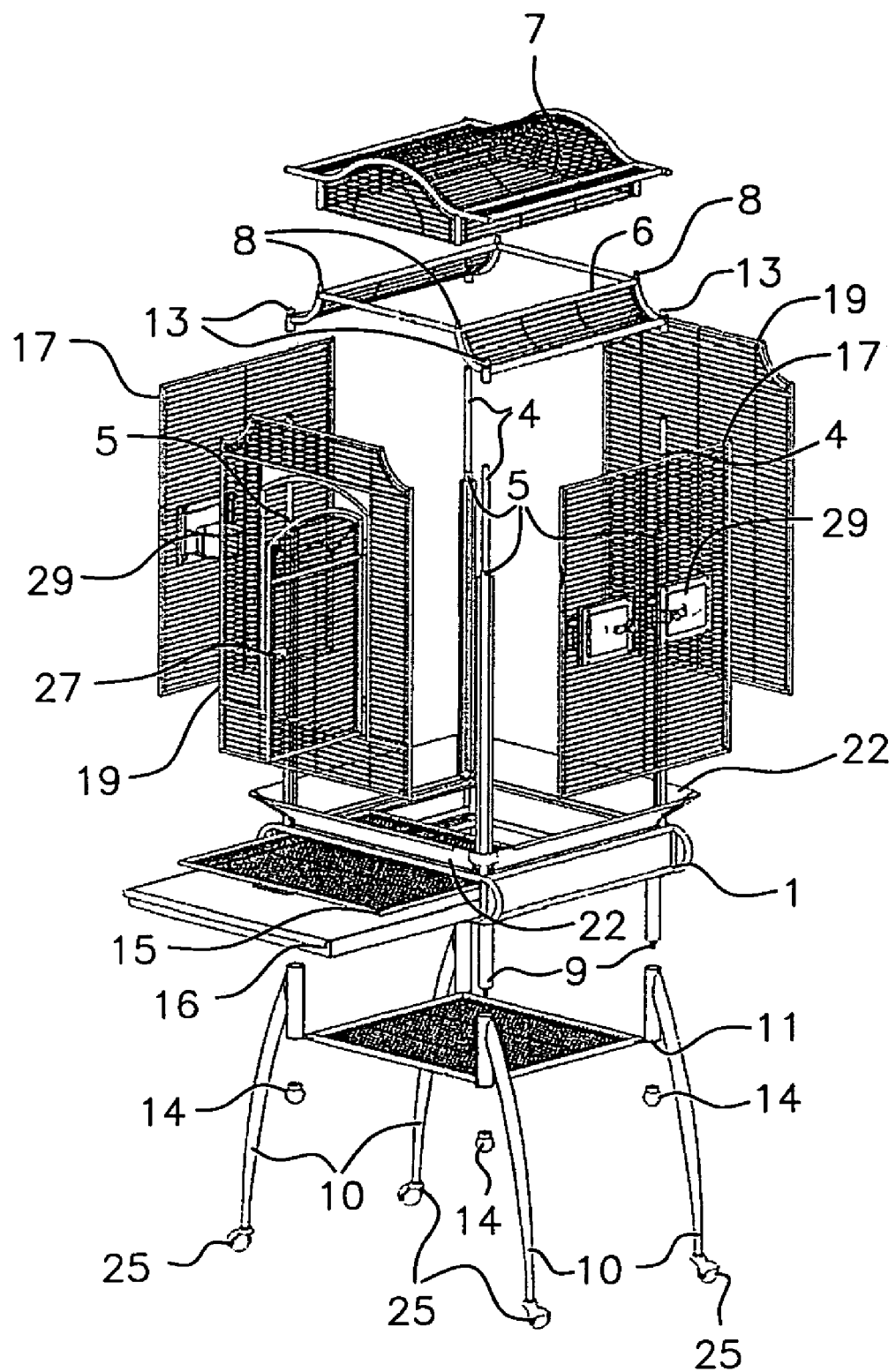
FIG. 1 is an exploded view of the bird cage of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to drawings, in general, and to FIGS. 1 through 5 in particular, a modular bird cage embodying the teachings of the subject invention is shown. With reference to its orientation in FIG. 1, the bird cage includes a base portion 1 upon which a support structure for side panels is mounted.

An upper portion of the bird cage is secured above the base portion by the support structure. Legs secured to the base portion elevate the bird cage above the floor.

The base portion includes a slidable screen tray 15 and a slidable bottom tray 16 positioned at a bottom of the bird cage. Tray 15 provides a bottom surface for a bird to rest and tray 16 collects debris that passes through the tray 15. The trays 15 and 16 are slidable out of the base for cleaning. Surrounding the trays 15, 16 are four angled surfaces 22 intended to collect any debris that passes out of the side panels of the bird cage due to the movement of the contained birds. The surfaces 22 also collect debris, such as scattered bird seed.

Figure 3:
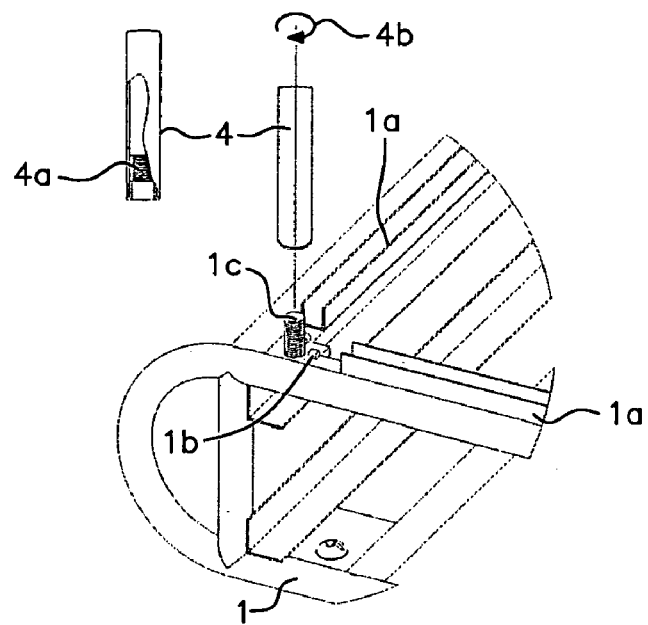
FIG. 3 is an enlarged view of the area encircled in FIG. 2B and labeled as A.

To assemble the housing of the bird cage located above the base portion, forming one of the inventive features of the present invention, and as shown in more detail in FIG. 3, in each of the four corners of the base portion 1 is located an externally threaded vertically extending stud 1c. Projecting laterally and perpendicular to each other in a plane perpendicular to the stud 1c are two lugs 1b formed in a rod shape. An end of the lug 1b closest to the stud 1c is spaced from the stud 1c by a wall thickness of column 4.

Figure 4:
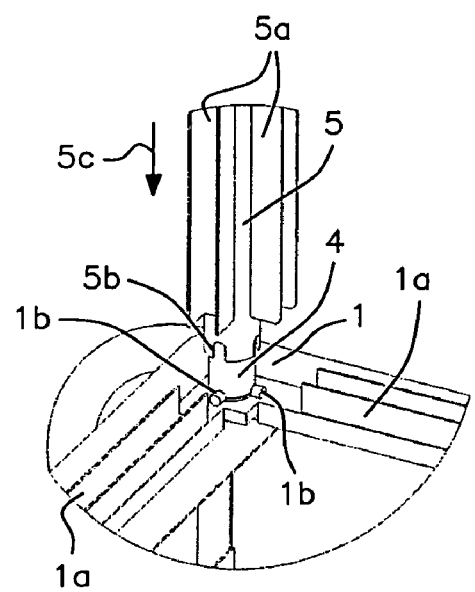
FIG. 4 is an enlarged view of the area encircled in FIG. 2B and labeled B.
Figure 5:
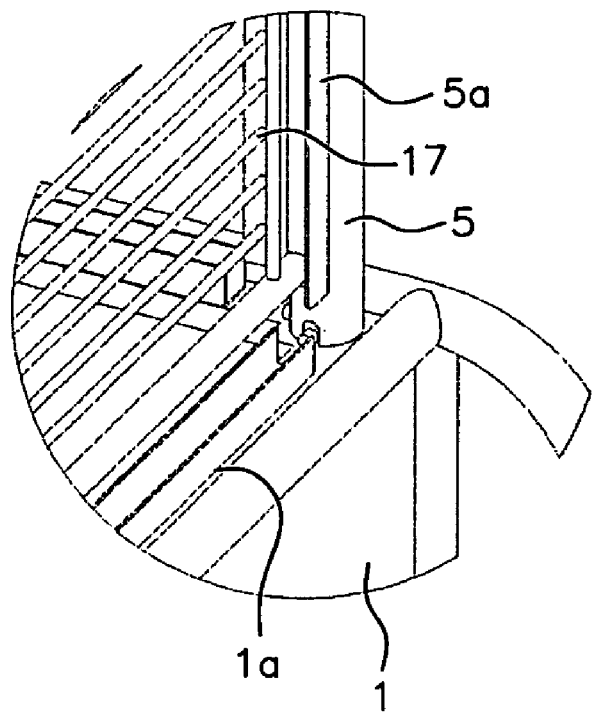
FIG. 5 is an enlarged view of the area encircled in FIG. 2B and labeled C.

Column 4 includes an internally threaded portion 4a such that as shown in FIG. 3. Upon rotation in the direction of arrow 4b, the bottom end of column 4 is threaded onto stud 1c so as to fit around the stud 1c and into a gap between the stud 1c and the lugs 1b as shown in FIG. 4.

Fitted on top of the column 4 is a post 5 as moved in the direction of arrow 5c. At the bottom of the post 5 are arched openings 5b having a shape consistent with lugs 1b so as to fit around the lugs 1b and contact the base portion 1 by the bottom edge of the post 5.

The post 5 includes two U-shaped channels 5a which project radially outwardly from the post 5 and extend perpendicular to each other. When the post 5 is fitted over the column 4 and the openings 5b engage the lugs 1b, the channels 5a on the sides of the post 5 align with vertically opening U-shaped channels 1a located on the base portion 1.

Figure 2A:
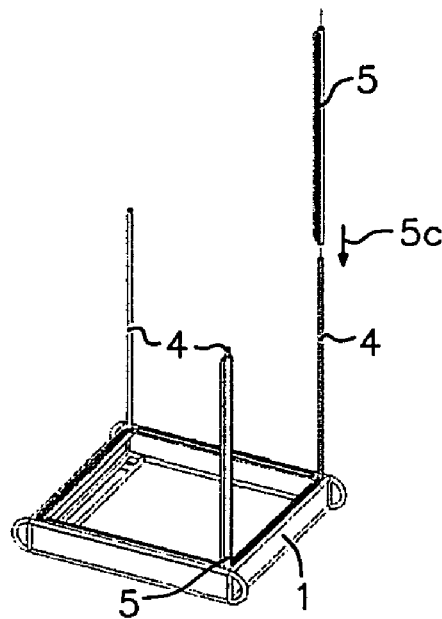
FIG. 2A illustrates the assembly on the base portion of an internal column and a surrounding post.
Figure 2B:
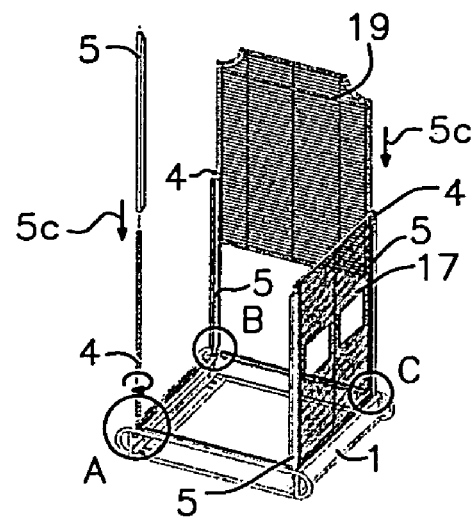
FIG. 2B illustrates the sliding of panels between assembled columns and posts.

Therefore, as shown in FIGS. 2A and 2B, with four sets of posts 4 and columns 5 arranged at the corners of the base portion, it is possible to removably slide two opposed side panels 17 and two opposed side panels 19 down within the U-shaped channels 5a formed by the post 5 and channels 1a of base portion 1. This is shown in greater detail in FIG. 5.

As shown in FIG. 1, the side panels 17 and 19 may include various features such as a doorway 27 or bird feeding panels 29 to gain access to the interior of the bird cage. These features formed by the side panels are commonly known.

Figure 6A:
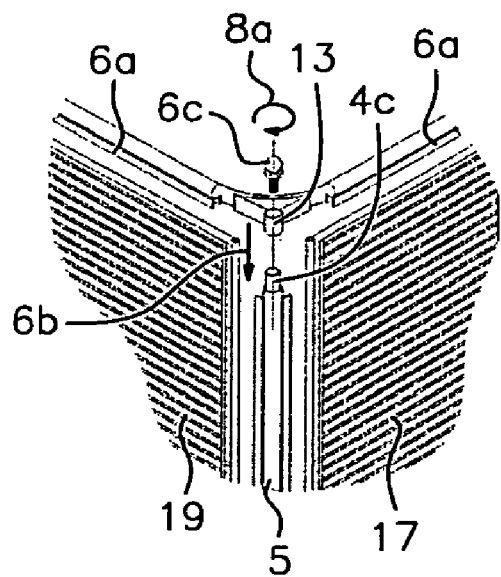
FIG. 6A is an exploded view of the assembly of an upper portion onto a column and post assembly.

At the upper portion 6 of the bird cage, four U-shaped downwardly projecting channels 6a are aligned along the sides of the upper portion 6 so as to be coincident with the upper surface of the side panels 17, 19. A hollow tube portion 13 located at the corner of the upper portions is moved in the direction of arrow 6b as shown in FIG. 6A to fit on top of a portion 4c at the top of the column 4. The tube portion 13 engages at its lower edge with the upper edge of post 5. A finial 6c is rotated in the direction of arrow 8a to threadingly engage internal threads in portion 4c of column 4. This secures the upper portion 6 on top of the side panels 17, 19 as shown in FIG. 6B.

Figure 6B:
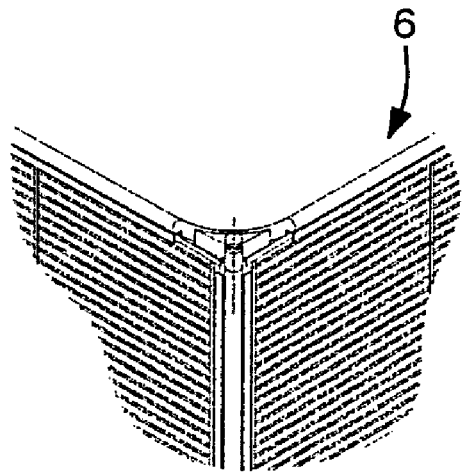
FIG. 6B is an assembled view of the components shown in FIG. 6A.

In FIGS. 6A and 6B, the configuration of the upper portion 6 is consistent with the upper portion of side panels 17 and 19 for ease of illustration. It is understood that the upper portion could be consistent with the shape of the upper edges of side panels 17 and 19 as shown in FIG. 1.

As shown in FIG. 1, upper portion 6 may include upwardly projecting pins 8 for engaging with a bottom surface of canopy 7. The canopy may be removably mounted on the top of the upper portion 6.

Figure 7A:
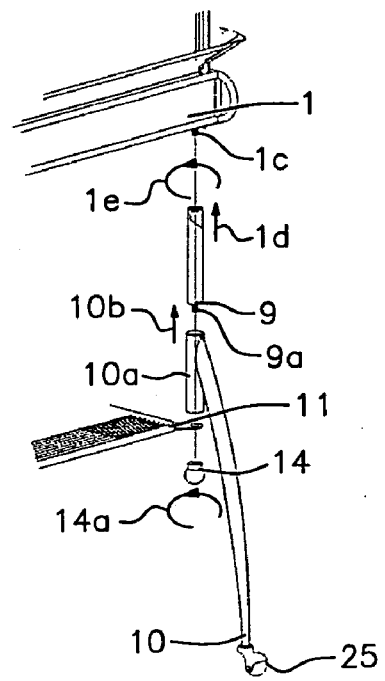
FIG. 7A is an exploded view of an elevated structure for the base portion.
Figure 7B:
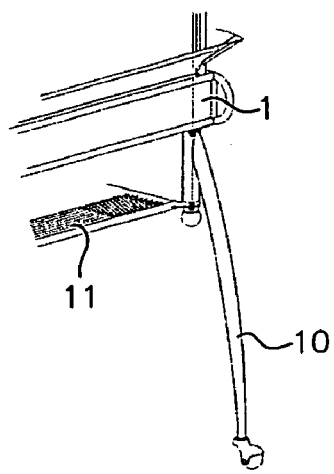
FIG. 7B is an assembled view of the elevated structure of the base portion.

The support structure for the bird cage is shown in FIGS. 7A and 7B. A support rod 9 is threadably secured to a threaded pin 1c by movement in the direction of arrow 1d and rotation in the direction of arrow 1e. When the support rod 9 is secured to the bottom of the base portion, a hollow post 10a, mounted at the top of leg 10, slides in the direction of arrow 10b over the support rod 9 so that threaded pin 9a projects out the bottom of the sleeve 10a. Internally threaded finial 14 engages threaded pin 9a by rotation in the direction of arrow 14a so as to secure the leg 10 to the base portion 1. A projection extending from a corner of support tray 11 includes an aperture which fits on the pin 9a for capture by the finial 14.

Support tray 11 is spaced downwardly from the base portion. Tray 11 may hold pet supplies and other products. The bottom of the leg 10 includes a caster 25 for movement of the entire modular bird cage.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A modular bird cage comprising
a base portion having a plurality of corners,
an upper portion,
a plurality of side panels, and
a support assembly removably securing the side panels between the base portion and the upper portion,
the support assembly including
a stud extending from each of the plurality of corners of the base portion,
two lugs extending perpendicular to a respective stud and transverse to each other,
a column mounted on each said stud, and
a post slidably mounted on each said column, each said post having an opening engaging said two lugs.

2. The modular bird cage as claimed in claim 1, wherein said two lugs are mounted on said base portion.

3. The modular bird cage as claimed in claim 1, wherein each said post includes two U-shaped channels extending radially outwardly from said post and transverse to each other.

4. The modular bird cage as claimed in claim 3, wherein said two U-shaped channels extend perpendicular to each other.

5. The modular bird cage as claimed in claim 1, wherein said two lugs extend perpendicular to each other.

6. The modular bird cage as claimed in claim 1, wherein there are four of said corners.

7. The modular bird cage as claimed in claim 1, wherein said base portion includes a plurality of U-shaped channels extending upwardly from said base portion.

8. The modular bird cage as claimed in claim 7, wherein there are four of said plurality of U-shaped channels extending perpendicular to adjacent ones of said plurality of U-shaped channels.

9. The modular bird cage as claimed in claim 1, wherein said stud is externally threaded and said column is internally threaded.

10. The modular bird cage as claimed in claim 9, wherein said column fits between said stud and said two lugs.

11. A modular bird cage comprising
a base portion having a plurality of corners,
an upper portion,
a plurality of side panels, and
a support assembly removably securing the side panels between the base portion and the upper portion,
the support assembly including
a threaded stud extending from each of the plurality of corners of the base portion,
two lugs extending perpendicular to a respective stud and transverse to each other,
an internally threaded column threadingly mounted on each said stud, and
a post slidably mounted on each said column, each said post having two openings engaging said two lugs, said post having a lesser length than said column.

12. The modular bird cage as claimed in claim 11, wherein said two lugs are mounted on said base portion.

13. The modular bird cage as claimed in claim 11, wherein each said post includes two U-shaped channels extending radially outwardly from said post and transverse to each other, said U-shaped channels engaging said side panels.

14. The modular bird cage as claimed in claim 13, wherein said two U-shaped channels extend perpendicular to each other.

15. The modular bird cage as claimed in claim 11, wherein said two lugs extend perpendicular to each other.

16. The modular bird cage as claimed in claim 11, wherein said base portion includes a plurality of U-shaped channels extending upwardly from said base portion, said U-shaped channels engaging said side panels.

17. The modular bird cage as claimed in claim 11, wherein said column fills a gap between said stud and said two lugs.

\* \* \* \* \*